United States Patent [19]

Sandin

[11] 4,093,001
[45] June 6, 1978

[54] EXCESS FLOW VALVE

[75] Inventor: Billy F. E. Sandin, Kumla, Sweden

[73] Assignee: AB Kalle-Regulatorer, Saffle, Sweden

[21] Appl. No.: 671,552

[22] Filed: Mar. 29, 1976

[51] Int. Cl.² ............................................. F16K 31/12
[52] U.S. Cl. .................................... 137/495; 137/498; 137/517
[58] Field of Search ............... 137/517, 522, 460, 495, 137/531, 498; 251/243

[56] References Cited

U.S. PATENT DOCUMENTS

| | | | |
|---|---|---|---|
| 90,278 | 5/1869 | Linnard | 137/522 |
| 469,611 | 2/1892 | Tully | 137/498 |
| 1,766,945 | 6/1930 | Riehm | 251/243 X |
| 3,143,137 | 8/1964 | Muller | 137/517 X |
| 3,379,213 | 4/1968 | Billington | 137/517 X |
| 3,631,893 | 1/1972 | Seaman | 137/517 X |
| 3,765,520 | 10/1973 | Asano et al. | 251/243 |

Primary Examiner—William R. Cline
Attorney, Agent, or Firm—Merchant, Gould, Smith, Edell, Welter & Schmidt

[57] ABSTRACT

An excess flow valve for use in a conduit as a precaution to quickly shut off the flow of a fluid in said conduit in the event of a rupture in the conduit. A valve disc is connected to a linkage including a two-arm lever, one arm of which engages a spring-biased stop for adjusting the distance of the valve disc to its valve seat in quiescent flow state and the other arm of which is connected to a setting device for manually or automatically closing the valve regardless of the pressure of the fluid flowing through the valve.

2 Claims, 1 Drawing Figure

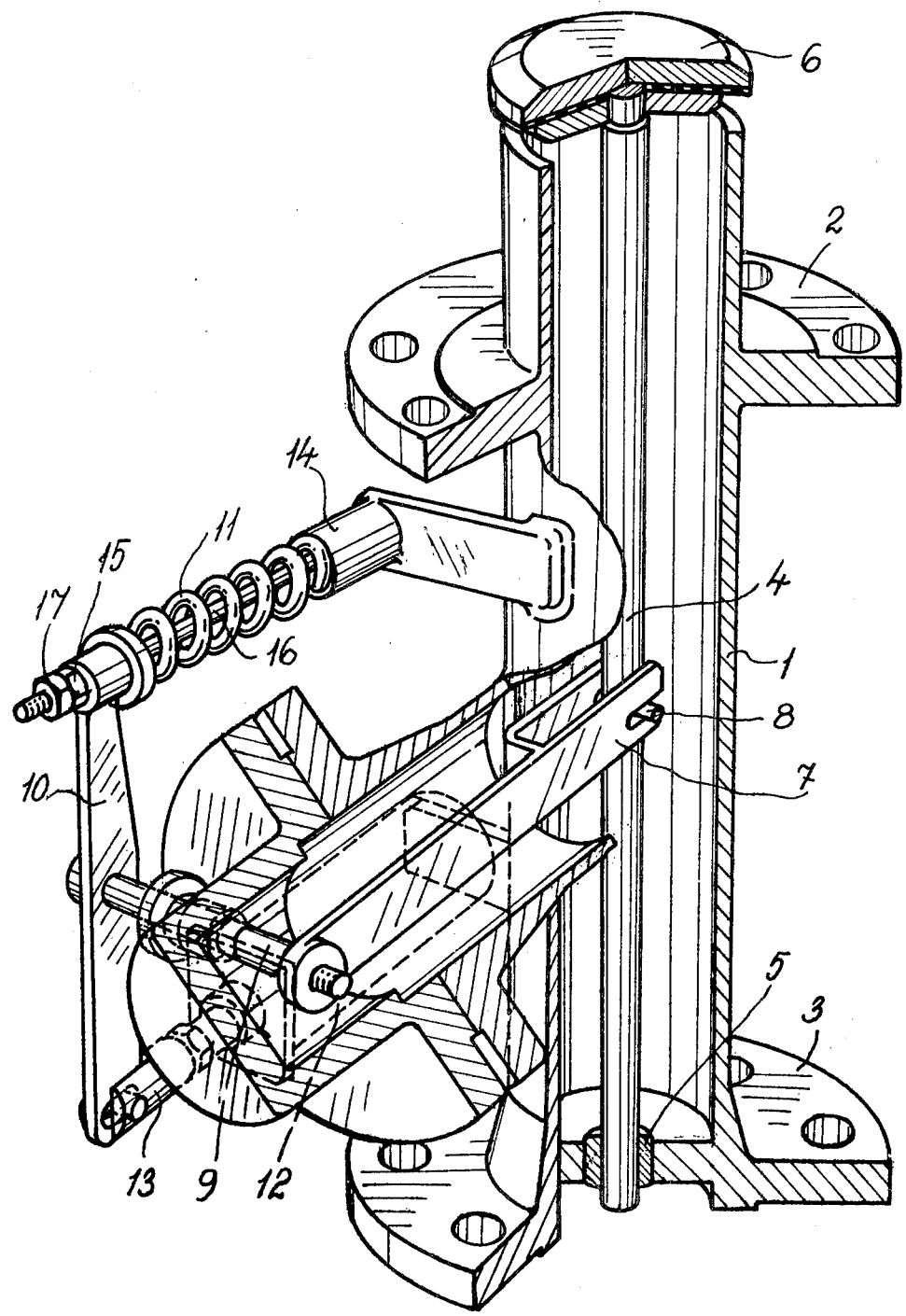

EXCESS FLOW VALVE

BACKGROUND OF THE INVENTION

1. Field of the Invention

This invention refers to an excess flow valve adapted to be disposed in a conduit for a flowing medium which may be a liquid or a gas.

2. Description of the Prior Art

Excess flow valves or pipe rupture valves are known in the prior art, in which a movable ball engages a valve seat for performing the necessary sealing. Furthermore, there are globe valves which also may function as excess flow valves. However, these two types of valves as well as other types of valves have the disadvantage that it is not possible to adjust them in operation in response to varying velocities of the flow medium, such adjustment, however, being desirable for instantaneous closure.

SUMMARY OF THE INVENTION

The present invention has the object of eliminating the above-mentioned disadvantage by disclosing an excess flow valve whose closure function may be adjusted while the valve is in operation, in addition to which the valve may be closed manually by remote control in operation if desired. Said valve comprises en elongate valve housing, a valve stem disposed in said housing and provided with a substantially flat valve disc at one end for cooperating with a valve seat in the valve housing, a lever pivotally mounted to said valve stem, a two-arm lever rigidly affixed to the first-mentioned lever and disposed perpendicularly thereto, a spring-biased member serving as a stop for engagement by one end of said two-arm lever, and a setting device connected to the other end of said lever. It is a characteristic feature of said excess flow valve that said stop is adapted for adjusting the distance of the valve disc to its valve seat in quiescent state, whereas said setting device is utilized for manual or automatic closure of the valve irrespective of the pressure created by the medium flowing through the valve.

Should a rupture occur in the conduit in which the valve is disposed, thereby causing the supplied quantity of the flowing medium to increase abruptly, then a pressure drop will appear behind the valve disc of the excess flow valve and will cause said valve to close rapidly, thereby preventing damaging effects as the result of escaping medium. The higher the rate of flow is, the higher will of course the pressure drop become, and the faster will the valve close.

BRIEF DESCRIPTION OF THE DRAWING

The invention will be described more specifically below with reference to the accompanying single drawing which shows a perspective view of an excess flow valve in accordance with the invention partly in cross-section.

DESCRIPTION OF THE PREFERRED EMBODIMENT

The drawing shows an elongate valve housing 1 which is adapted to be connected in a conduit for a flowing medium by means of flanges 2 and 3. Alternatively, one of the flanges of the valve housing may be connected to for instance a tank containing a liquid or gaseous medium whereas its other flange is connected to a discharge lead.

An elongate valve stem 4 extending through valve housing 1 is shown to be mounted in a bushing 5 and is provided with a valve disc 6 at its upper end. The valve stem 4 is displaceable in the longitudinal direction of the valve housing within certain limits, with the valve being capable — by means of a lever 7 which will be described more specifically below — of being opened to a predetermined extent in one extreme position and of being completely closed in the other extreme position with the valve disc engaging the seat of valve housing 1.

Lever 7 extends perpendicularly to stem 4 and is at one end connected to the stem by means of a pin 8, whereas at its other end it is secured to a rotatable shaft 9 which in turn is secured to a two-arm lever 10, the upper end of which (as shown in the drawing) engages a helical spring 11 and the lower end of which is connected to a setting device 12 over a coupling member 13 with associated connecting parts.

In addition to engaging the two-way lever 10, the helical spring 11 engages a stationary stop 14 which in the illustrated example is attached to valve housing 1.

The mentioned setting device 12 may be of electric, pneumatic, magnetic or hydraulic type, and its function will be described more specifically below.

The excess flow valve of the invention operates in the following manner. When valve housing 1 is connected in a conduit by means of flanges 2 and 3, with said conduit thus being connected to the respective outsides of the flanges, the intention is that a flowing medium should be able to penetrate into the valve housing from above in the play between the valve disc and the valve housing and to be conveyed through the valve housing and further on to the continuation of the conduit. If for some reason the flow of medium suddenly increases violently in force, the valve is to be closed so that the flow of medium flowing through the valve and the continuation of the conduit ceases. Closure of the valve in this manner occurs on one hand as the result of the increase of pressure generated by the flowing medium towards the valve disc in a direction from above the downwardly, as viewed in the drawing, and on the other hand as the result of the pressure drop that appears below the valve disc. However, the pressure to which the valve is subjected by the flowing medium is counteracted by the pressure with which helical spring 11 actuates valve stem 4 and thus valve disc 6 over the upper portion of two-arm lever 10, shaft 9, and lever 7. Hence, the rate of the flow and in connection therewith the pressure for which the valve closes may be selected arbitrarily and entirely in dependence of the rate of inflow.

According to the invention it is highly important that the flow-through area of the valve may be set from the exterior, which is done simply by controlling the stroke of two-way lever 10, lever 7, and valve stem 4 by displacing the end of two-way lever 10 engaging spring 11 towards stop 14 and by moving said end away from said stop 14, respectively. This is done by threading in and threading out, respectively, a nut 15 which engages threads on a pin 16 extending through helical spring 11 and being secured to stop 14. The nut 15 may be blocked in its set position by means of a locknut 17. A small fluid penetration area will result in a large pressure drop over the valve disc and thus in earlier closure of the valve, whereas a large penetration area will means a low pressure drop and thereby later closure of the valve.

It should be noted that spring 11 merely comprises an example of an appropriate compressible medium and may be replaced by other means if desired.

At times it may be desirable to close the excess flow valve positively, i.e. by forced operation, and this may to advantage be done by actuation of the above-mentioned setting means 12, whereby the two-arm lever 10 may be rotated and thus can make the valve disc engage its valve seat at the end of the valve housing 1 for closing the valve. As has been mentioned above, setting means 12 may for instance consist of an electric, magnetic, hydraulic, or pneumatic device, and this device may be actuated in conventional manner, for instance by pushbutton control. A setting device of this type can be of great value if for example analysis of a medium flowing out into the atmosphere as the result of leakage shows that the concentration of the relevant medium, for example propane, butane, ammonia or clorine, in the atmosphere is unexpectedly great, wherein the setting means 12 may be utilized for immediately closing the valve. Closing the valve may also be carried out automatically by means of a pulse from an analysis instrument.

Another important field of use of the valve in accordance with the invention is in connection with reloading for instance gasoline from a tank car to a conveyor of other type. The valve may then be mounted in such manner that if the reloading tube suddenly ruptures and thus the rate of flow of the gasoline increases abruptly, the valve will close, thereby preventing a disaster. As may be seen above, the use of the valve is not restricted to liquids, and it may be utilized in connection with gases, for instance butane and/or propane, compressed air, etc. Another application is if a toxic medium is pumped in a conduit from one point in the area of a plant to another point and said conduit ruptures for some reason or other. In this case a valve of the mentioned type may be utilized for instantaneously cutting off the flow.

The invention is not restricted to the embodiment described above and illustrated in the drawing, and this embodiment merely comprises an example of the invention and of its application.

What is claimed is:

1. An excess flow valve, comprising:
   (a) an elongate valve housing having a flow passage extending therethrough, an upstream portion of said housing defining a valve seat;
   (b) a valve stem disposed in said housing and extending through said flow passage for reciprocal movement therein, said valve stem being provided with a substantially flat valve disc at its upstream end for cooperating with said valve seat to open and close said flow passage;
   (c) a lever pivotally mounted to said valve stem and extending outwardly therefrom for reciprocally driving said valve stem, said pivot being of the lost motion type;
   (d) a two-arm lever pivotally mounted with respect to said housing, said two-arm lever being rigidly affixed to said first mentioned lever and disposed perpendicularly thereto;
   (e) a spring carried by said valve housing and engaging one end of said two-arm lever to bias said two-arm lever in a first direction to open said flow passage, and means carried by said valve housing for adjusting the tension of said spring;
   (f) selectively actuable means for applying a motive force connected to the other end of said two-arm lever to move said two arm lever in a second direction to close said flow passage; and
   (g) wherein said adjusting means is adapted for adjusting the distance of said valve disc to said valve seat in a quiescent state by adjusting the tension of said spring, wherein said spring serves to bias said valve disc to an open position unless and until there is a drop in pressure on the downstream side of said disc and whereas said motive force applying means is utilized for closure of the flow passage irrespective of the pressure created by a medium flowing through the flow passage.

2. The excess flow valve of claim 1 wherein said spring is adjustable externally of said valve housing to vary the gap between said valve disc and said valve seat.

* * * * *